No. 710,950. Patented Oct. 14, 1902.
M. J. CAMERON.
ATTACHMENT FOR COVERS FOR POTS, &c.
(Application filed May 29, 1901.)
(No Model.)
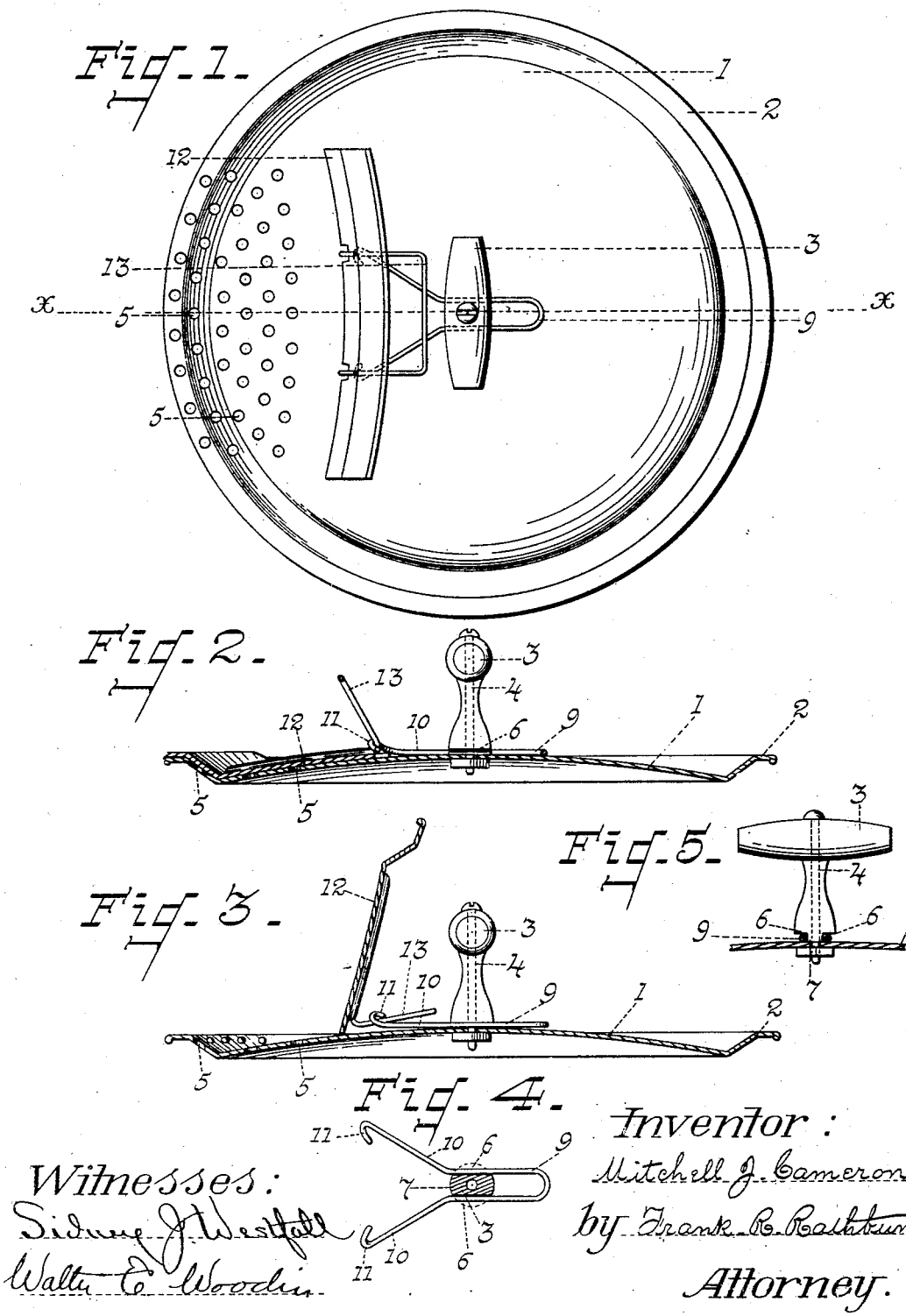
Witnesses:
Sidney J. Westfall
Walter E. Woodin
Inventor:
Mitchell J. Cameron,
by Frank R. Rathbun
Attorney.

UNITED STATES PATENT OFFICE.

MITCHELL J. CAMERON, OF AUBURN, NEW YORK.

ATTACHMENT FOR COVERS FOR POTS, &c.

SPECIFICATION forming part of Letters Patent No. 710,950, dated October 14, 1902.

Application filed May 29, 1901. Serial No. 62,375. (No model.)

*To all whom it may concern:*

Be it known that I, MITCHELL J. CAMERON, a citizen of the United States, and a resident of Auburn, county of Cayuga, State of New York, have invented a new and useful Improvement in Attachments for Covers for Pots, &c., of which the following is a specification, reference being had to the accompanying drawings, on one sheet, making part of this specification.

My invention relates to the covers of pots, &c., which have a rim for assuring their position on the pot and a strainer or draining-apertures at one side thereof for draining away hot or other liquids from the pot or vessel; and the objects of my improvement are, first, to provide an attachment for said covers that may be readily operated for closing the draining-apertures of the said cover and uncovering the same without risk of burning the hand or fingers in the operation; secondly, to provide means for locking the attachment in position when the said drainer-apertures are uncovered thereby; thirdly, to provide a handle on said covers of peculiar construction and one that shall be a non-conductor of heat, and, lastly, to provide means whereby my attachment may be readily removed and applied on other covers of varying sizes, as the operator may desire.

I accomplish the above objects by the mechanism shown in the accompanying drawings, which are made to a scale of about one-half the actual working size, and in which—

Figure 1 is a top side plan view of an ordinary pot-cover having draining-apertures at one side with my attachment applied thereon and in a position uncovering the draining-apertures where it is locked or retained. Fig. 2 is a cross-section through the pot-cover and the attachment on the dotted line *x x* of Fig. 1, excepting that the attachment is shown unlocked and covering the draining-apertures. Fig. 3 is a cross-section similar to that shown in Fig. 2, excepting that the attachment is shown in its locked position and uncovering the draining-apertures. Fig. 4 is a detached view of the loop and Y-hooks forming a part or member of my attachment. Fig. 5 is a rearward elevation of the handle of the pot-cover.

Similar figures of reference refer to similar parts in the several views.

Referring to Fig. 1, 1 is the cover of the pot or vessel, and it is provided with the rim 2, the handle 3, which latter is secured centrally on said cover by a bolt 4, and the draining-apertures 5, which latter are formed on the outer side of the cover, as seen in the drawings. The said several parts of the cover, with the exception of the handle, are of the ordinary construction.

The handle 3 is of a T or crutch-head shape and is made, preferably, of wood, as being a non-conductor of heat. The bottom of the handle is cut away at either side, as shown in Fig. 5, at 6 6, thus leaving a central portion 7, which rests on the upper central side of the cover 1 when the handle is secured in place thereon by the bolt 4. A loop 9 (see Fig. 4) is provided and is extended toward the draining side of the cover into the Y-shaped terminals 10 10, which are provided at their ends with the hooks 11 11, the purpose of which will presently be seen. The central portion 7 of the bottom of the handle 3 passes into the loop 9, and thus assures the desired position of the latter on the upper side of the cover 1. A flap or shield 12 is provided of an area sufficient to more than cover all of the draining-openings 5, and its outside edge is made to conform to the shape of the rim 2 of the cover 1, as seen in Figs. 2 and 3. Its opposite or rearward edge is slightly curved in shape in order that the closest possible contact between said curved rearward edge and the upper side of the cover may be assured and is provided with a bail 13, which is bent upwardly and at a slight forward angle, as plainly seen in Fig. 2. The said bail 13 is fastened by its ends on one side of the flap 12, preferably on the under side, and is of a width sufficient to engage in the hooks 11 11 of the Y-shaped terminals 10 10 of the loop 9, as seen in Fig. 1.

The several parts described are all assembled on the upper side of the cover 1 in the following relative positions: The flap or shield 12 is placed over the draining-apertures 5, with the bail 13 projecting upward. The hooks 11 11 of the Y-shaped terminals 10 10 of the loop 9 are next properly hooked onto the sides of the bail 13 of the said flap 12, and the several parts are then secured in working place by the passage of the central portion 7 of the bottom of the handle 3 passing in the loop 9, where the bolt 4, passing through the handle and cover, secures the whole, as shown in Fig. 3. When the flap or shield is down on the draining-apertures, it very naturally becomes as heated as the cover itself when the liquids and contents of the pot or vessel are being boiled. Evidently it could not be raised from its forward edge without danger of burning the hand or fingers. This difficulty is obviated by operating the said flap or shield from its rearward side by the bail attached thereto. The flap or shield being raised by the downward pressure of the fingers upon the bail thereof it becomes when raised to its full extent locked or secured in position by the partial slipping forward of the sides of the bail in the hooks of the Y-shaped terminals and the bearing of the bottom edge of the flap against the upper side of the cover. This action is clearly seen in Fig. 3. To release the bail and the flap from the locked position, it becomes necessary to exert a slight rearward pull upon the bail only, when the flap naturally falls to its normal position over the draining-apertures with the said bail projecting upward and in convenient position for being again actuated.

As the placement of the flap or shield in proper position on the cover is dependent on the position of the loop of the Y-shaped terminals thereon, it will readily be seen that the improvement may be used in covers of various sizes, thus enabling me to make the several parts entering into the improvement of a single form and size and equally operative on covers of varying diameters, as has been said.

Having thus explained the several parts and operation of my improvement, what I claim as new, and desire to secure by Letters Patent of the United States, is—

1. In an attachment for the covers of pots, &c., the flap or shield 12, having its outer edge comformable to the rim of the pot-cover, its inner edge slightly curved and having an upwardly-extended bail 13, combined with the loop 9, having Y-shaped terminals provided with hooks 11, at their ends and means for holding said loop 9, in position on said cover, constructed substantially in the manner and for the purpose herein described and shown.

2. In an attachment for the covers of pots, &c., the flap or shield 12, having its outer edge comformable to the rim of the pot-cover, its inner edge slightly curved and having an upwardly-extended bail 13; and the loop 9, having Y-shaped terminals provided with hooks 11, at their ends in combination with the handle 3, or its equivalent, having the bottom end arranged in the said loop and secured to the cover substantially in the manner and for the purpose herein described and shown.

In testimony whereof I have hereunto set my hand at Auburn, New York, this 27th day of May, A. D. 1901.

MITCHELL J. CAMERON.

In presence of—
  RAY P. MEAKER,
  A. L. HEMINGWAY.